(12) United States Patent
Hamada et al.

(10) Patent No.: US 7,713,056 B2
(45) Date of Patent: May 11, 2010

(54) CATALYTIC COMBUSTOR

(75) Inventors: Karuki Hamada, Yokohama (JP);
Tadashi Shoji, Yokohama (JP); Nobuo Sakiyama, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/911,431

(22) PCT Filed: Jun. 29, 2006

(86) PCT No.: PCT/IB2006/001803

§ 371 (c)(1),
(2), (4) Date: Oct. 12, 2007

(87) PCT Pub. No.: WO2007/004020

PCT Pub. Date: Jan. 11, 2007

(65) Prior Publication Data

US 2008/0193887 A1 Aug. 14, 2008

(30) Foreign Application Priority Data

Jul. 1, 2005 (JP) ............................. 2005-194282
Apr. 21, 2006 (JP) ............................. 2006-118077

(51) Int. Cl.
*F23D 14/18* (2006.01)
*F23N 5/00* (2006.01)

(52) U.S. Cl. ....................... 431/328; 431/170; 431/7; 431/107; 431/268

(58) Field of Classification Search ............. 431/7, 431/328, 268, 170
See application file for complete search history.

(56) References Cited

U.S. PATENT DOCUMENTS

| | | | | |
|---|---|---|---|---|
| 3,839,224 | A  * | 10/1974 | Yonehara et al. ............... | 502/66 |
| 6,908,301 | B2 * | 6/2005 | Yamaguchi et al. ........... | 431/75 |
| 7,326,483 | B2 * | 2/2008 | Hamada et al. ............... | 429/26 |
| 2003/0096204 | A1 * | 5/2003 | Hermann et al. ............... | 431/7 |
| 2004/0126724 | A1 * | 7/2004 | Yamaguchi et al. ............ | 431/2 |
| 2005/0090392 | A1 * | 4/2005 | Moon et al. .................. | 502/320 |

FOREIGN PATENT DOCUMENTS

| | | | |
|---|---|---|---|
| EP | 1036982 A1 | | 9/2000 |
| JP | 10-169908 A | | 6/1998 |
| JP | 10227413 A | * | 8/1998 |
| JP | 10227413 A | * | 8/1998 |
| JP | 2000-266316 A | | 9/2000 |
| JP | 2001-33011 A | | 2/2001 |
| JP | 2001033011 | * | 2/2001 |
| JP | 2004-296397 A | | 10/2004 |
| JP | 2005-142100 A | | 6/2005 |

* cited by examiner

*Primary Examiner*—Steven B McAllister
*Assistant Examiner*—Nikhil Mashruwala
(74) *Attorney, Agent, or Firm*—Global IP Counselors, LLP

(57) ABSTRACT

A catalytic combustor is configured to accelerate the combustion processing of anode off gas in the combustor to reduce the amount of unburned hydrogen discharged to the outside of the combustor. Anode off gas and cathode off gas discharged from the fuel cell are fed into the catalytic combustor and combusted with a catalyst. Ventilation air is supplied from inside of the fuel cell is also supplied to the catalytic combustor. A portion of the catalytic combustor located upstream of the catalyst inside is divided into an upper flow path and a lower flow path by a partitioning plate and a gas flow passage is provided upstream of the upper and lower flow paths. The cathode off gas is supplied to the gas flow passage.

17 Claims, 12 Drawing Sheets

US 7,713,056 B2

CATALYTIC COMBUSTOR

CROSS-REFERENCE TO RELATED APPLICATIONS

This U.S. National stage application claims priority to Japanese Patent Application No. 2005-194282, filed in Japan on Jul. 1, 2005, and Japanese Patent Application No. 2006-118077, filed in Japan on Apr. 21, 2006, the entire contents of which are hereby incorporated herein by reference.

BACKGROUND OF THE INVENTION

1. Field of the Invention

The present invention relates to a catalytic combustor for mixing anode off gas discharged from an anode of a fuel cell with cathode off gas discharged from a cathode of the fuel cell and combusting the mixture.

2. Background Information

Catalytic combustors have been proposed for combusting off gas discharged from a fuel cell. One example of a catalytic combustor is disclosed in Japanese Laid-Open Patent Publication No. 2004-95258 which describes an idea of preventing the temperature of the catalyst of a catalytic combustor from falling by providing a bypass flow passage through which the cathode off gas discharged from the cathode of a fuel cell can be made to bypass the catalyst, and thereby, preventing moisture contained in the cathode gas from condensing and sticking to the catalyst.

In view of the above, it will be apparent to those skilled in the art from this disclosure that there exists a need for an improved catalytic combustor. This invention addresses this need in the art as well as other needs, which will become apparent to those skilled in the art from this disclosure.

SUMMARY OF THE INVENTION

With the catalytic combustor described in Japanese Laid-Open Patent Publication No. 2004-95258, when a large quantity of condensed moisture is supplied to the combustor together with the cathode off gas as a result of purging the inside of the anode of the fuel cell, the bypass flow passage may not be sufficient to prevent the catalyst from being affected by the moisture and undergoing a decline in combustion performance.

One object of the present invention is to accelerate the combustion processing of anode off gas in the combustor and, thereby, reduce the amount of unburned hydrogen discharged to the outside of the combustor.

In order to achieve the above stated object and other objects of the present invention, a catalytic combustor is provided that basically includes a housing and a catalyst. The housing includes an anode off gas inlet for receiving anode off gas discharged from an anode of a fuel cell, a cathode off gas inlet for receiving cathode off gas discharged from a cathode of the fuel cell and an exhaust gas outlet for discharging combusted gas. The catalyst is disposed inside the housing between the anode off gas and cathode off gas inlets and the exhaust gas outlet. The housing is configured to form a horizontally arranged gas flow passage that receive the anode off gas and cathode off gas flow in an upstream portion that directs the anode off gas and cathode to the catalyst. The upstream portion includes a divided section that is located directly upstream of the catalyst and divided into at least two vertically arranged flow paths.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings in which like characters represent like elements. Thus, the descriptions of parts in later embodiments or variations that are identical to earlier parts of prior embodiments may be omitted for the sake of brevity. It will be apparent to those skilled in the art from this disclosure that the following descriptions of the embodiments or variations of the present invention are provided for illustration only and not for the purpose of limiting the invention as defined by the appended claims and their equivalents. In this regard, no attempt is made to show structural details of the invention in more detail than is necessary for the fundamental understanding of the present invention, the description taken with the drawings making apparent to those skilled in the art how the several forms of the present invention can be embodied in practice.

Overall Configuration of Fuel Cell System

Figure 1:
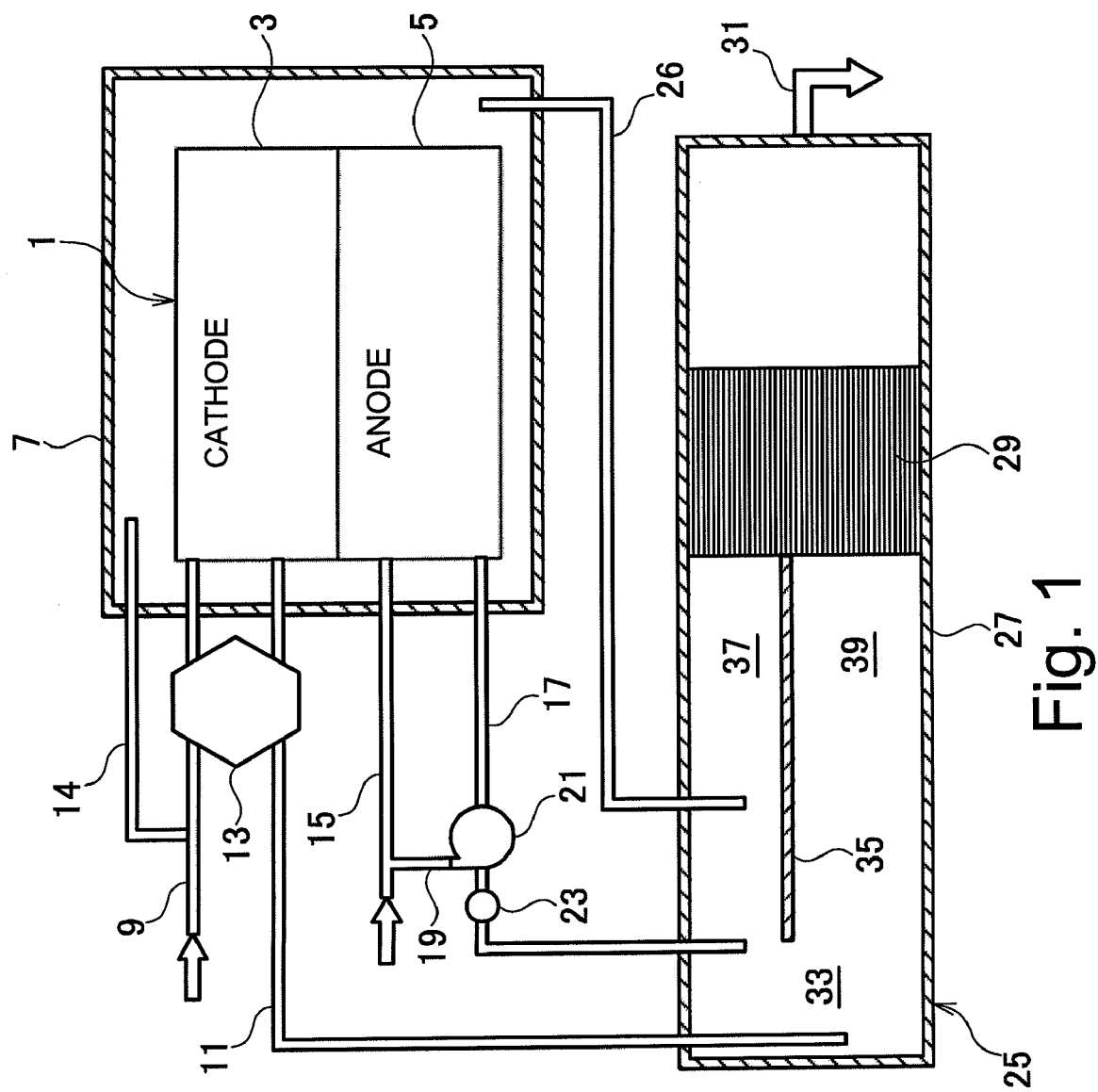
FIG. 1 is a schematic side cross sectional view of an entire fuel cell system that includes a catalytic combustor in accordance with a first embodiment of the present invention.

Referring initially to FIG. 1, an overall configuration of a fuel cell system is schematically illustrated in which the present invention is employed. The fuel cell 1 basically has a cathode 3, an anode 5 and a case 7 that houses both the cathode 3 and the anode 5. An air supply pipe 9 and a cathode off gas pipe 11 are connected to the cathode 3. Preferably, a humidifier 13 is installed in both pipes 9 and 11 at intermediate positions from the fuel cell 1. Thus, air supplied to the cathode 3 passes through the humidifier 13 prior to entering the cathode 3, and cathode off gas exiting the cathode 3 passes through the humidifier 13. A ventilation air supply pipe 14 connects a portion of the air supply pipe 9 located upstream of the humidifier 13 to supply air to the inside of the case 7.

A hydrogen supply pipe 15 and an anode off gas pipe 17 are connected to the anode 5. A hydrogen circulation pipe 19 is connected between the anode off gas pipe 17 and the hydrogen supply pipe 15. A hydrogen circulation pump 21 is installed at the connection between the hydrogen circulation pipe 19 and the anode off gas pipe 17. An anode purge valve 23 is installed in a portion of the anode off gas pipe 17 located downstream of the hydrogen circulation pump 21. Instead of using a hydrogen circulation pump 21 to circulate the anode off gas, it is also possible to use an ejector or any other suitable device that will perform a substantially equivalent function as the hydrogen circulation pump 21.

The cathode off gas pipe 11 and the anode off gas pipe 17 are both connected to a catalytic combustor 25 that is configured in accordance with the present invention. A ventilation air discharge pipe 26 is arranged with one end connected to the inside of the case 7 and the other end connected to the catalytic combustor 25.

The catalytic combustor 25 basically includes a housing 27 and a catalyst 29 for combustion. The cathode off gas pipe 11, the anode off gas pipe 17, and the ventilation air discharge pipe 26 are connected to the catalytic combustor 25 at positions in the vicinity of one end of the housing 27, and the catalyst 29 is arranged inside the housing 27 at a position downstream of where the pipes 11, 17, and 26 are connected. Thus, the housing 27 includes an anode off gas inlet where the anode off gas pipe 17 is connected to the housing 27, a cathode off gas inlet where the cathode off gas pipe 11 is connected to the housing 27, and a ventilation air inlet where the ventilation air discharge pipe 26 is connected to the housing 27. An exhaust pipe 31 is connected to the end of the housing 27 located downstream of the catalyst 29 for discharging combustion gas generated by the catalyst 29. Thus, the housing 27 includes an exhaust gas outlet where the exhaust pipe 31 is connected to the housing 27.

The housing 27 generally includes a gas flow passage 33 that is arranged to receive the anode off gas from the anode off gas pipe 17 and the cathode off gas inlet from the cathode off gas pipe 11. The catalyst 29 is disposed in the gas flow passage 33 for receiving the anode off gas and the cathode off gas. The catalyst 29 can be a well-known catalyst comprising, for example, platinum or another precious metal carried on a metal honeycomb or ceramic honeycomb carrier.

An upstream portion of the gas flow passage 33 that is located directly upstream of the catalyst 29 is divided by a horizontal partitioning plate or partition wall 35 into an upper or first flow path 37 and a lower or second flow path 39. The flow paths 37 and 39 are arranged vertically above and below each other by the partition wall 35 (discussed later).

In the system described above, outside air is supplied through the air supply pipe 9 using a well-known air supplying device (not shown), such as a compressor, and the outside air is humidified in the humidifier 13 using a portion of the moisture contained in the cathode off gas flowing through the cathode off gas pipe 11.

After the humidified gas supplied to the cathode 3 of the fuel cell 1 has been used for electricity generation, it is discharged from the cathode 3 as cathode off gas. The discharged cathode off gas flows through the cathode off gas pipe 11 and is delivered to the catalytic combustor 25. Along the way, the cathode off gas passes through the humidifier 13 and loses a portion of its moisture to the outside air.

Meanwhile, if the fuel is hydrogen, the hydrogen is supplied from a hydrogen supply source (not shown) and flows through the hydrogen supply pipe 15 to the anode 5 of the fuel cell 1. Similarly, if the fuel is a hydrocarbon, a reformed gas is supplied to the hydrogen supply pipe 15 from a system configured to produce a hydrogen-rich reformed gas using a reformer and the reformed gas is supplied to the anode 5 of the fuel cell 1.

Fuel gas not used for generating electricity in the fuel cell 1 flows through the anode off gas pipe 17, passes through the hydrogen circulation pump 21 and the hydrogen circulation pipe 19, and is reintroduced to the anode 5 from the hydrogen supply pipe 15 as anode in gas. Fuel gas not used for generating electricity in the fuel cell 1 can also be discharged through the anode purge valve 23 as anode off gas and delivered to the catalytic combustor 25 through the portion of the anode off gas pipe 17 located downstream of the anode purge valve 23.

The anode off gas supplied to the catalytic combustor 25 and the cathode off gas supplied to the catalytic combustor 25 mix together inside the housing 27 before reaching the catalyst 29. After the combustion of the anode off gas is finished, i.e., after the oxygen serving as the oxidizer for combusting the anode off gas has been consumed, the resulting combustion gas is discharged out of the system through the exhaust pipe 31.

A portion of the air supplied to the air supply pipe 9 flows into the ventilation air supply pipe 14 connected upstream of the humidifier 13 and is supplied as ventilation air to the space inside the case 7 on the outside of the fuel cell 1. The ventilation air serves to dilute hydrogen that has permeated from the fuel cell 1 and is delivered to the catalytic combustor 27 through the ventilation air discharge pipe 26. The tiny quantity of hydrogen contained in the delivered ventilation air is combusted with the catalyst 29 in the same manner as described previously.

The fuel cell 1 is configured to generate electricity by an electrochemical reaction involving the hydrogen of the anode 5 and the oxygen of the cathode 3. During the course of generating electricity, the hydrogen and the oxygen react such that water and water vapor are produced inside the cathode 3. Over time, the moisture produced in the cathode 3 and the nitrogen component of the air supplied to the cathode 3 diffuse to the anode 5 due to the partial pressure difference between the electrodes. As moisture and nitrogen gas collect in the anode 5, the partial pressure of hydrogen inside the anode 5 declines and moisture covers the membrane on the anode side, causing the electricity generation efficiency to decline.

In order to prevent the electricity generation efficiency from declining in this manner, when the partial pressure of hydrogen declines, the anode purge valve 23 is opened and gas containing impurities is discharged from the anode purge valve 23. Since unused hydrogen is also discharged together with the impurity-containing gas, the unused hydrogen is combusted in the catalytic combustor 25 before being discharged to the outside.

The anode purge valve 23 is controlled (opened and closed) in accordance with the operating state of the fuel cell system. The method of controlling the anode purge valve 23 can be to intermittently open and close the anode purge valve 23 so as to purge the anode 5 intermittently or to constantly control the degree to which the anode purge valve 23 is open so as to continuously control the rate (amount per unit time) at which purge gas from the anode 5 is discharged. The catalytic combustor 25 in accordance with this embodiment execute combustion in an efficient manner, as will be discussed later, and can accommodate either of these purge methods.

First Embodiment of the Catalytic Combustor

Figure 2:
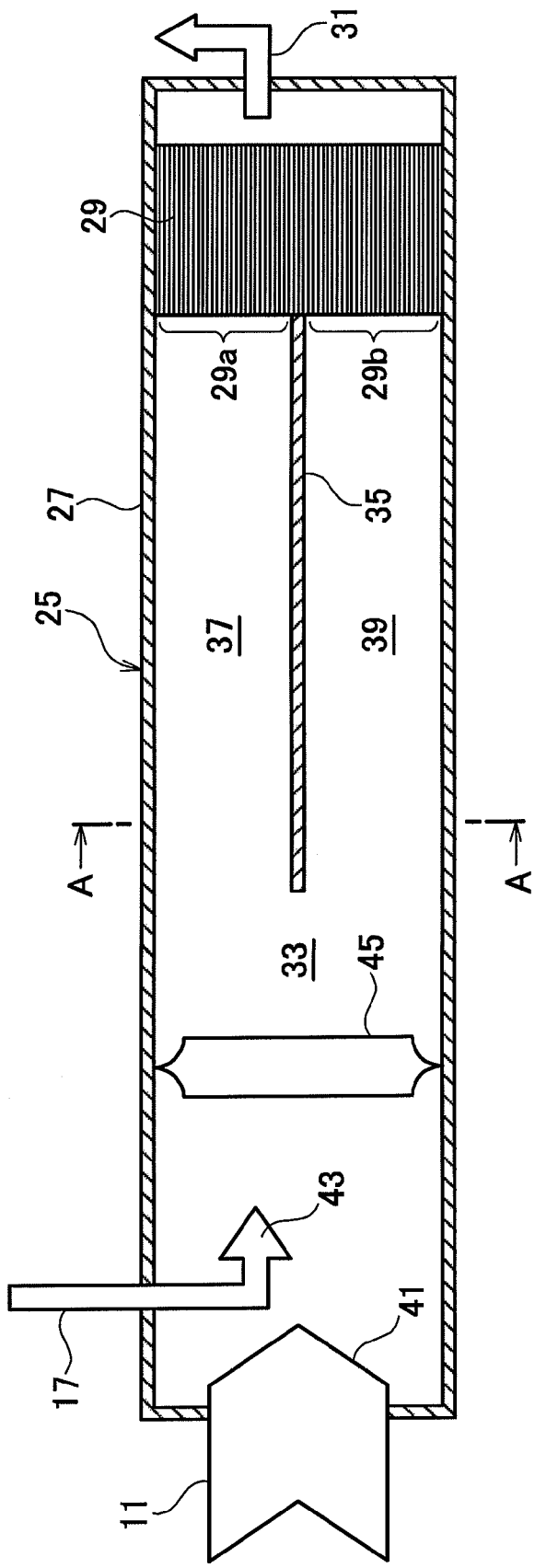
FIG. 2 is a simplified longitudinal cross sectional view of the catalytic combustor to be used in the fuel cell system shown in FIG. 1 in accordance with the first embodiment of the present invention.
Figure 3A:
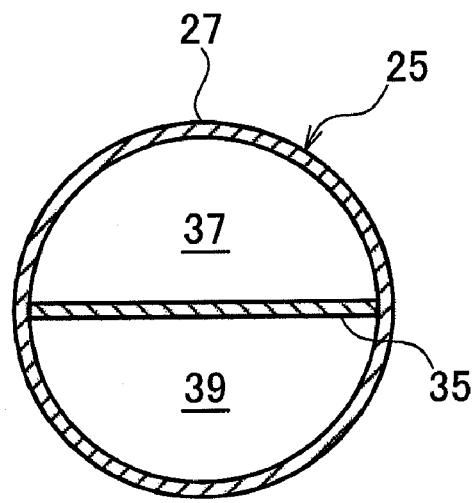
FIG. 3(a) is a simplified transverse cross sectional view of the catalytic combustor illustrated in FIG. 2 taken along section line A-A of FIG. 2 in accordance with the first embodiment of the present invention.
Figure 3B:
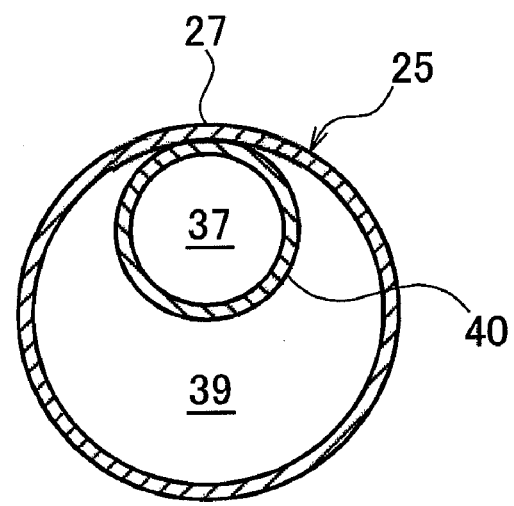
FIG. 3(b) is a simplified transverse cross sectional view, similar to FIG. 3(a), of a catalytic combustor in accordance with a first variation of the first embodiment of the present invention.

Referring now to FIGS. 2, 3(a) and 3(b), the main features of the catalytic combustor 25 will now be described in detail. Basically, the catalytic combustor 25 of this embodiment of the present invention mixes anode off gas discharged from the anode 5 of a fuel cell 1 with cathode off gas discharged from the cathode 3 of the fuel cell 1 and then combusts the mixture of gases.

FIG. 2 is a simplified longitudinal cross sectional view of the catalytic combustor 25 to be used in the fuel cell system shown in FIG. 1 in accordance with the first embodiment of the present invention. FIG. 3(a) is a simplified transverse cross sectional view of the catalytic combustor 25 illustrated in FIG. 2 taken along section line A-A of FIG. 2. FIG. 3(b) is a simplified transverse cross sectional view, similar to FIG. 3(a), of the catalytic combustor 25, but in accordance with a first variation of the first embodiment of the present invention.

The housing 27 of the catalytic combustor 25 shown in FIG. 2 is cylindrical in shape, as shown in FIGS. 3(a) and 3(b), and defines the gas flow passage 33 through which the anode off gas and the cathode off gas flow. As mentioned above, an upstream portion of the gas flow passage 33 that is located immediately upstream of the catalyst 29 is divided into two vertically arranged flow paths. In particular, namely, the upper flow path 37 and the lower flow path 39 are formed by the horizontal partitioning plate 35 provided in a generally middle position relative to the vertical direction (i.e., the up and down direction in FIG. 2).

As shown in FIG. 3(b), it is also acceptable to provide a partitioning pipe 40 in place of the horizontal partitioning plate 35 as a horizontal partition wall. The partitioning pipe 40 has a smaller diameter than the housing 27 and is located in an upper portion of the inside of the housing 27 to divide the gas flow passage 33 inside the housing 27 into two flow passages, i.e., the upper flow path 37 and the lower flow path 39, arranged along the vertical direction.

The end of the partitioning plate 35 depicted as the right-hand end in FIG. 2 almost contacts the catalyst 29 and the other end of the partitioning plate 25 (left end in FIG. 2) is positioned approximately at the middle in the lengthwise dimension of the housing 27 between the upstream end of the housing 27 and the upstream end of the catalyst 29. The same configuration is also used in the partitioning pipe 40.

As shown in FIG. 1, the cathode off gas pipe 11 and the anode off gas pipe 17 both connect to the catalytic combustor 25 in the vicinity of the upstream end of the catalytic combustor 25. More specifically, in the catalytic combustor 25 of FIGS. 2, 3(a) and 3(b), the cathode off gas pipe 11 is connected to the end face of the housing 27 and a cathode off gas introducing port 41 is provided in the housing 27. Meanwhile, in the catalytic combustor 25 of FIGS. 2, 3(a) and 3(b), the anode off gas pipe 17 is connected to the side face of the housing 27 and the corresponding anode off gas introducing port 43 is inserted inside the housing 27 and positioned slightly downstream relative to the cathode off gas introducing port 41. The anode off gas introducing port 43 is shaped like a fuel injection pipe configured to inject the anode off gas into the interior. The anode off gas introducing port 43 comprises, for example, a stainless steel pipe having a diameter of approximately ¼ inch and a fuel injection hole for injecting the anode off gas provided in the end face of the pipe. There can be one fuel injection hole provided in the center of the end face of the pipe or a plurality of fuel injection holes provided in the end face of the pipe.

A gas mixing unit 45 is provided in the gas flow passage 33 at a position upstream of the partitioning plate 35 (or the partitioning pipe 40) for mixing the cathode off gas (which contains oxygen that serves as an oxidizer) and the anode off gas together. The gas mixture produced by the gas mixing unit 45 is combusted by the catalyst 29 located downstream. The gas mixing unit 45 can be a structure that simply forms a space or a unit that employs a well-known gas mixing technology, such as a swirler or a plurality of multi-holed plates.

The ventilation air discharge pipe 26 is not illustrated in FIG. 2, but would be in the same position illustrated in FIG. 1.

In the catalytic combustor 25 shown in FIG. 2, the cathode off gas introduced into the housing 27 from the cathode off gas pipe 11 and the anode off gas introduced into the housing 27 from the anode off gas pipe 17 are mixed together in the mixing unit 45 upstream of the partitioning plate 35. The flow of mixed gas is then divided in two by passing into the upper flow path 37 and the lower flow path 39.

Although the mixed gas contains moisture (water), the moisture (water) flows downward due to gravity and, thus, flows chiefly into the lower flow path 39. Consequently, the mixed gas flowing in the upper flow path 37 is a dry gas containing little moisture (water).

As a result, moisture (water) does not tend to adhere to the vertically upper portion 29a of the catalyst 29 that corresponds to the upper flow path 37 and ignition and combustion occur with good efficiency in the vertically upper portion 29a. The heat of combustion that results from the ignition and combustion that occur in the vertically upper portion 29a causes the entire catalyst 29 to warm up. Consequently, the temperature of the vertically lower portion 29b corresponding to the lower flow path 39 (into which much moisture flows) rises and ignition occurs reliably in the vertically lower portion 29b. The combustion gas that remains after combustion in the catalyst 29 is discharged to the outside of the combustor 25 through the exhaust pipe 31.

Thus, the anode off gas can be combusted efficiently because good overall combustion is promoted by the efficient combustion that takes place in the vertically upper portion 29a corresponding to the upper flow path 37. As a result, the discharge of unburned hydrogen to the outside of the combustor 25 can be suppressed even when a large quantity of condensed moisture is supplied to the combustor 25 together with the cathode off gas as a result of purging the inside of the anode 5 of the fuel cell 1 or when hydrogen migrates from the anode 5 to the cathode 3 as so-called "crossover hydrogen."

The housing 27 and the partitioning plate 35 of the catalytic combustor 25 are made of a stainless steel alloy or other material that can withstand the internal conditions of the catalytic combustor 25 (e.g., combustion temperature, pressure, and gas mixture). Other materials can be used so long as the combustor 25 is designed such that the gas flow rate, generated amount of heat, and other requirements of the combustion system can be satisfied. The housing 27 of the catalytic combustor 25 does not necessarily have to be cylindrical in shape.

Also, the position from which the anode off gas is injected into the catalytic combustor 25 is not limited to the position shown in FIG. 2. For example, it is acceptable to inject the anode off gas from the upstream end face of the housing in the same manner as the cathode off gas, in direction perpendicular to the flow direction of the cathode off gas, or from a position further downstream than the position shown in FIG. 2.

When the anode off gas is injected from a position closer to the catalyst 29 (further downstream) than the position shown in FIG. 2, it is necessary to design the combustor in a manner that takes into consideration such factors as the effect that the injection position has on the formation of the gas mixture and the effect that the heat of combustion of the catalyst 29 has on the anode off gas introducing port 43 and the anode off gas.

Second Embodiment of the Catalytic Combustor

Figure 4:
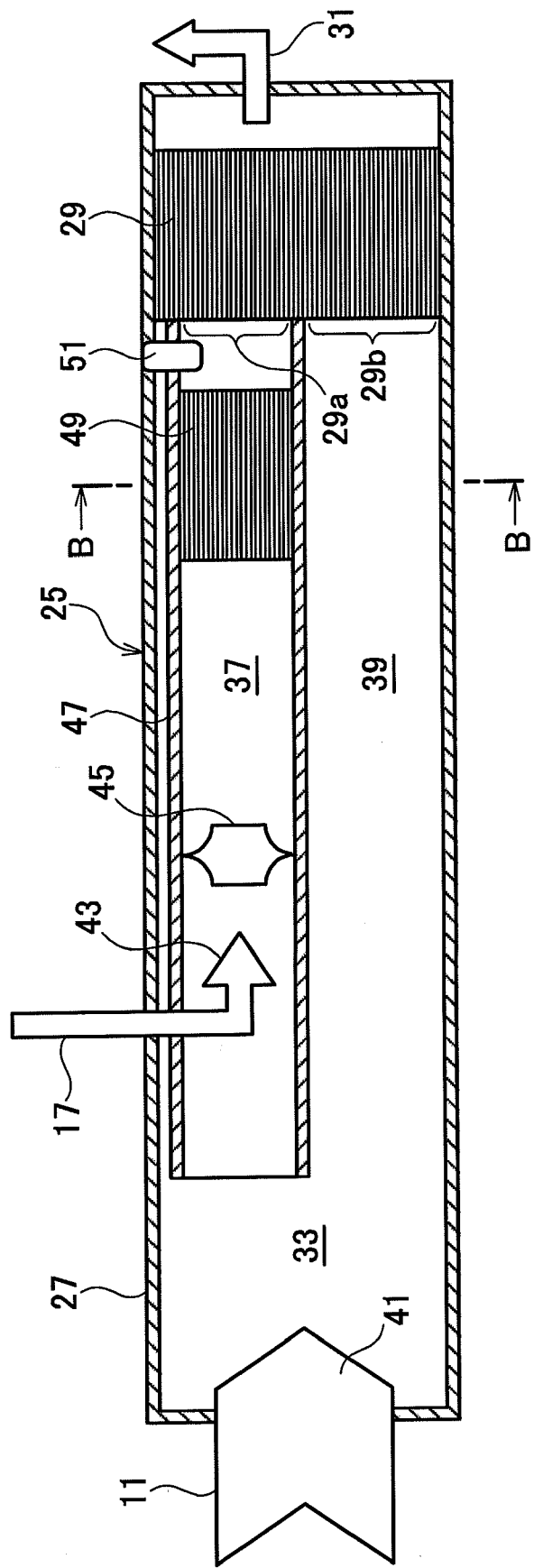
FIG. 4 is a simplified longitudinal cross sectional view of the catalytic combustor to be used in the fuel cell system shown in FIG. 1 in accordance with a second embodiment of the present invention.
Figure 5A:
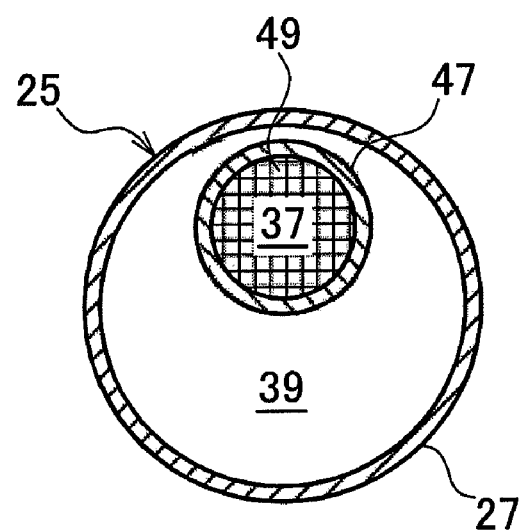
FIG. 5(a) is a simplified transverse cross sectional view of the catalytic combustor illustrated in FIG. 4 taken along section line B-B of FIG. 4 in accordance with the second embodiment of the present invention.

FIG. 4 is a side cross sectional view of a second embodiment of the catalytic combustor 25. FIG. 5(a) is a cross sectional view taken along section line B-B of FIG. 4. Component parts of the second embodiment of the catalytic combustor 25 that are the same as the parts of the first embodiment are indicated with the same reference numerals as in the first embodiment and explanations thereof are omitted for the sake of brevity.

Figure 5B:
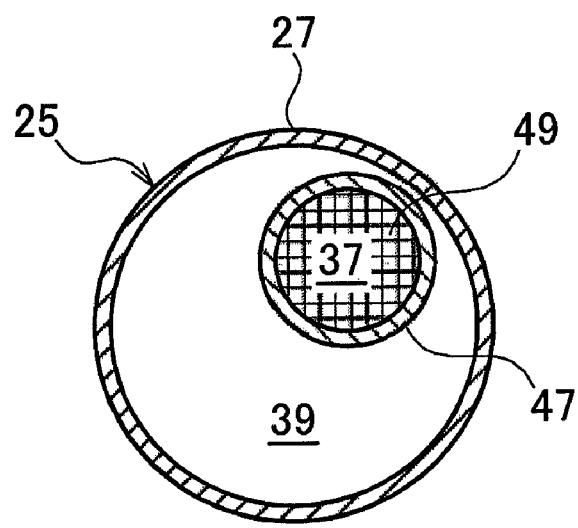
FIG. 5(b) is a simplified transverse cross sectional view, similar to FIG. 5(a), of a catalytic combustor in accordance with a first variation of the second embodiment of the present invention.

In the embodiment, as shown in FIG. 5(b), a partitioning pipe 47 is used as the partition wall that divides the gas flow passage 33 into a plurality of flow paths. The partitioning pipe 47 has a smaller diameter than the housing 27. The partitioning pipe 47 encloses an upper portion of the inside of the housing 27 to divide the gas flow passage 33 inside the housing 27 into two vertically arranged flow paths, namely, the upper flow path 37 and the lower flow path 39.

The partitioning pipe 47 is arranged such that the downstream end thereof almost contacts the catalyst 29 and the upstream end thereof is positioned near the upstream end of the housing 27. In this embodiment a gap exists between the top side of the partitioning pipe 47 and the top portion of the internal wall surface of the housing 27, but it is also acceptable to arrange the partitioning pipe 47 such that it contacts the housing 27 as shown in FIG. 3(b).

The anode off gas pipe 17 passes through the side of the housing 27 and connects to the partitioning pipe 47 near the upstream end of the partitioning pipe 47, and the anode off gas introducing port 43 is arranged to face toward the downstream end of the upper flow path 37. In this embodiment, the gas mixing unit 45 is provided inside the upper passageway 37 (i.e., the partitioning pipe 47) at a position downstream of the anode off gas introducing port 43 and serves to mix anode off gas introduced from the anode off gas introducing port 43 with a portion of the cathode off gas introduced into the housing 27 from the cathode off gas introducing port 41 positioned further upstream, i.e., the portion of the introduced cathode off gas that flows into the partitioning pipe 47.

An additional catalyst 49 separate from the catalyst 29 is installed inside the upper flow path 37 in a position downstream of the gas mixing unit 45. The additional catalyst 49 serves to combust the gas mixture produced by the gas mixing unit 45. A temperature sensor 51 is installed between the additional catalyst 49 and the catalyst 29. The temperature sensor 51 is configured and arranged to detect the gas temperature after combustion in the additional catalyst 49.

The additional catalyst 49 that is installed inside the upper flow path 37 is smaller than the catalyst 29 installed downstream thereof. However, similarly to the catalyst 29, the additional catalyst 49 is an oxidizing catalyst comprising a precious metal supported on a carrier.

In the catalytic combustor 25 shown in FIG. 4, a portion of the cathode off gas introduced into the housing 27 from the cathode off gas pipe 11 flows into the upper flow path 37 inside the partitioning pipe 47 and the remainder of the cathode off gas flows through the lower flow path 39, which comprises a space inside the housing 27 on the outside of the partitioning pipe 47.

Although the cathode off gas contains moisture, the moisture (water) flows downward due to gravity and, thus, the moisture (water) flows mainly into the lower flow path 39. Consequently, the cathode off gas flowing in the upper flow path 37 is a drier gas containing little moisture (water). The dry cathode off gas is mixed with the anode off gas introduced into the upper flow path 37 from the anode off gas introducing port 43 in the gas mixing unit 45 and the resulting gas mixture is combusted when it reaches the additional catalyst 49 located downstream.

Ignition and combustion take place efficiently at the additional catalyst 49 because the cathode off gas that serves as the oxidizing agent is dry and little moisture (water) adheres to the additional catalyst 49. As the gas temperature downstream of the additional catalyst 49 rises due to the combustion taking place at the additional catalyst 49, the vertically upper portion 29a of the catalyst 29 corresponding to the upper flow path 37 is warmed and the heat is transferred to the entire catalyst 29. As a result, the entire catalyst 29 is substantially activated and, even in the vertically lower portion 29b corresponding to the lower flow path 39 into which a large amount of moisture (water) flows, the temperature rises such that ignition occurs reliably and the combustion efficiency improves. The combustion gas that remains after combustion in the catalyst 29 is discharged to the outside of the combustor 25 through the exhaust pipe 31.

Thus, with this embodiment, the anode off gas can be combusted efficiently because good overall combustion is promoted by the efficient combustion that takes place in the vertically upper portion 29a corresponding to the upper flow path 37. As a result, the discharge of unburned hydrogen to the outside of the combustor 25 can be suppressed even when a large quantity of condensed moisture is supplied to the combustor 25 together with the cathode off gas as a result of purging the inside of the anode 5 of the fuel cell 1 or when hydrogen migrates from the anode 5 to the cathode 3 as so-called "crossover hydrogen."

Also, in this embodiment, the anode off gas is supplied to the upper flow path 37 inside the partitioning pipe 47 and only portion of the cathode off gas is introduced into the upper flow path 37. As a result, the fuel concentration of the gas mixture can be maintained somewhat higher than in the first embodiment shown in FIG. 2 and the combustion efficiency can be improved.

When this fuel cell system is installed in a vehicle or other mobile entity, it is preferable to take into account not only the vertical position of the partitioning pipe 47 enclosed inside the housing 27 but also the position of the partitioning pipe 47 relative to the longitudinal direction of the vehicle or mobile entity (i.e., the direction along which the vehicle or mobile entity moves).

The condensed moisture in the cathode off gas is affected by gravity and the acceleration G of the vehicle more than it is affected by the gas flow. Since a large output is typically required when a vehicle or other mobile entity accelerates, the amount of condensed moisture produced is larger during acceleration. Conversely, during deceleration, the little output is required and the amount of condensed moisture produced decreases. Thus, the affect of condensed moisture on the catalyst is larger during acceleration than during deceleration.

Consequently, inside the housing 27, the condensed moisture gathers not only toward the bottom of the housing 27 but also toward the rear of the vehicle. In short, the gas flow passage 33 inside the housing 27 is preferably divided in a manner that takes into account how the condensed moisture moves when the vehicle accelerates.

For example, the housing 27 can be installed in the vehicle such that the gas flow passage 33 extends in a direction that intersects with the direction in which the vehicle moves, e.g., the widthwise direction of the vehicle, and the vertically upwardly positioned upper passageway 37 can be arranged as shown in FIG. 5(b), i.e., such that it is offset toward the front of the vehicle within the housing 27 (toward the right hand side in FIG. 5(b)). Such an arrangement would make it more difficult for moisture to flow into the upper flow path 37.

By adopting such an arrangement, the combustion characteristics of the catalytic converter 25 can be improved in situations where the fuel cell system is installed in a vehicle or other mobile entity.

Offsetting the upper flow path 37 toward the front of the vehicle within the housing 27 is not limited to catalytic combustors in which the partitioning pipe 47 is used. This present invention can also be readily employed in catalytic combustors that use the partitioning plate 35 as shown FIG. 3(a). For example, in order to use the partitioning plate 35 to achieve a performance similar to that of FIG. 5(b), the partitioning plate 35 should be installed such that it slants downward to the right when viewed from the perspective shown in FIG. 5(b).

Finally, in this embodiment, by installing the temperature sensor 51 downstream of the additional catalyst 49 to detect the combustion gas temperature, the detected temperature can be used to detect combustion abnormalities in the additional catalyst 49 and to execute various controls.

Third Embodiment of the Catalytic Combustor

Figure 6:
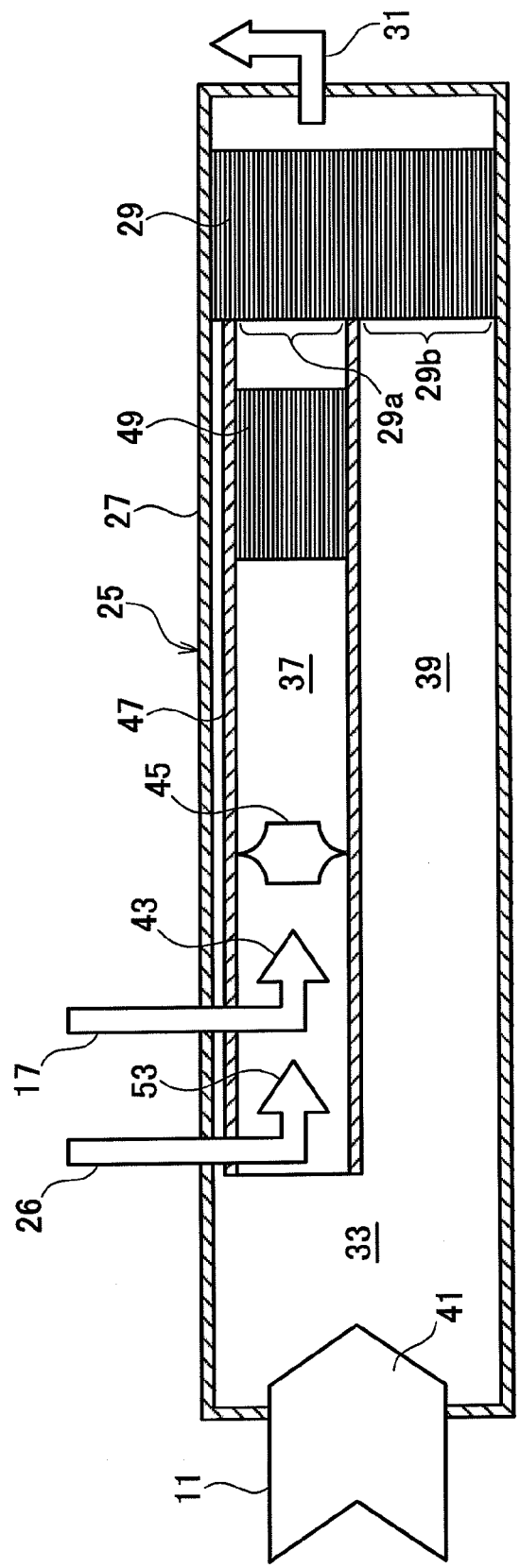
FIG. 6 is a simplified longitudinal cross sectional view of the catalytic combustor to be used in the fuel cell system shown in FIG. 1 in accordance with a third embodiment of the present invention.

FIG. 6 is a side cross sectional view of a third embodiment of the catalytic combustor 25. Component parts of the third embodiment of the catalytic combustor 25 that are the same as the parts of the second embodiment are indicated with the same reference numerals as in the second embodiment and explanations thereof are omitted for the sake of brevity.

This embodiment is the same as the catalytic combustor 25 of the second embodiment shown in FIG. 4, except that the ventilation air discharge pipe 26 shown in FIG. 1 is connected to the upper flow path 37 and the temperature sensor 51 is omitted.

The ventilation air discharge pipe 26 is arranged to pass through the housing 27 and protrude into the upper flow path 37 at a position upstream of the anode off gas pipe 17. A ventilation air introducing port 53 is arranged on the tip of the ventilation air discharge pipe 26 in such a fashion as to face downstream.

Thus, small amounts of hydrogen that have permeated the space surrounding the fuel cell 1 are diluted inside the case 7 using a portion of the air supplied from the air supply pipe 14 and the diluted gas is supplied to the upper flow path 37 of the catalytic combustor 25 through the ventilation air discharge pipe 26. The ventilation air introducing port 53 can be designed using the same design concept as the anode off gas introducing port 43.

Unlike the cathode off gas, the ventilation air introduced into the catalytic combustor 25 from the inside of the case 7 does not contain moisture produced by the generation of electricity in the fuel cell 1 and, thus, is comparatively dry (approximately as dry as the outside air). Thus, more reliable and efficient combustion can be achieved by conducting combustion in the additional catalyst 49 using the dry ventilation air. Since the concentration of hydrogen contained in the ventilation air is low, it is difficult to combust ventilation air alone. However, reliable and efficient combustion can be conducted when ventilation air is supplied to the additional catalyst 49 together with anode off gas.

Fourth Embodiment of the Catalytic Combustor

Figure 7:
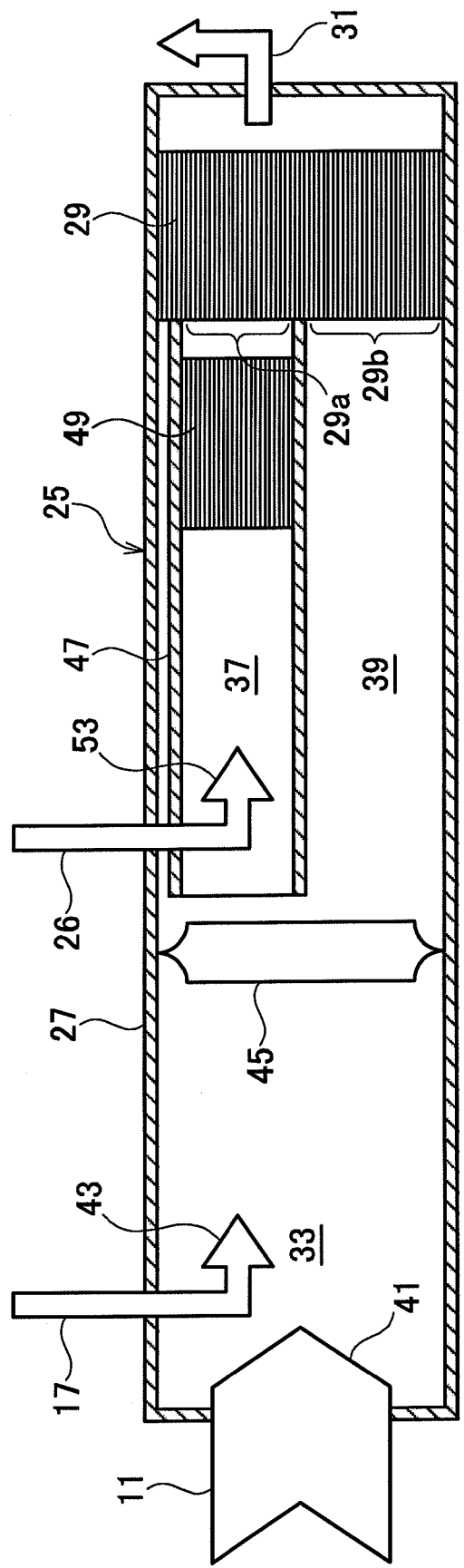
FIG. 7 is a simplified longitudinal cross sectional view of the catalytic combustor to be used in the fuel cell system shown in FIG. 1 in accordance with a fourth embodiment of the present invention.

FIG. 7 is a side cross sectional view of a fourth embodiment of the catalytic combustor 25. This embodiment is different from the third embodiment shown in FIG. 6 in that the anode off gas pipe 17 is arranged in the vicinity of the cathode off gas introducing port 41, similarly to the first embodiment shown in FIG. 2. Otherwise, this embodiment is the same as the third embodiment shown in FIG. 6.

With this arrangement of the anode off gas pipe 17, if a swirler or the like is installed as the gas mixing unit 45, it is preferable from the perspective of forming the gas mixture to install the gas mixing unit 45 that occupies the full cross section of the portion of the gas flow passage 33 located upstream of the upper flow path 37 as shown in FIG. 7. However, the embodiment is not limited to such an arrangement and it is acceptable to install the gas mixing unit 45 in the upper gas flow path 37 as is done in the third embodiment shown in FIG. 6.

Fifth Embodiment of the Catalytic Combustor

Figure 8:
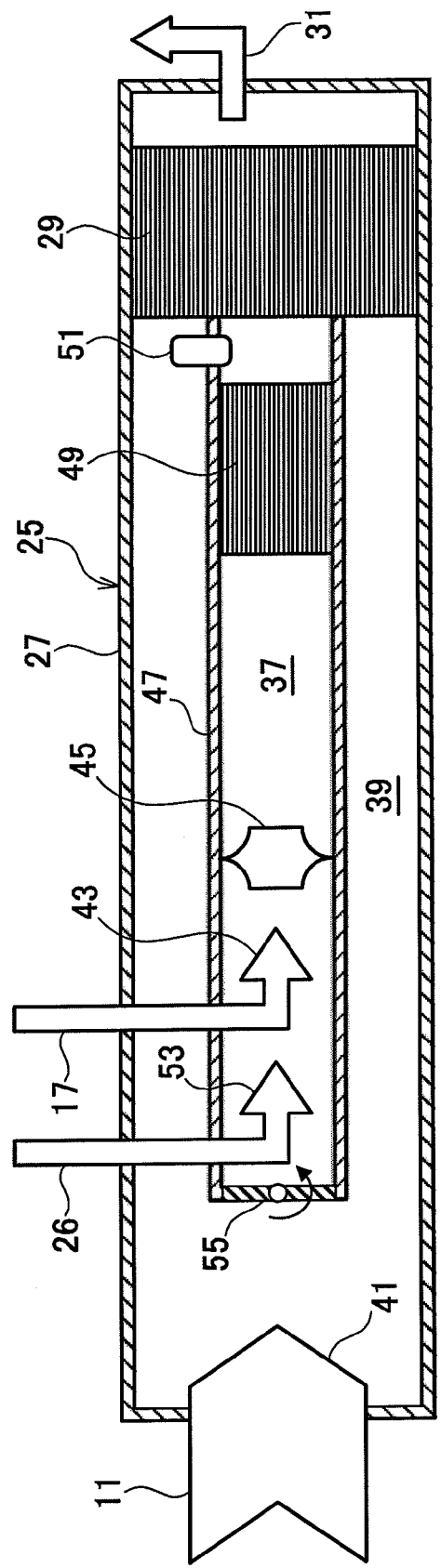
FIG. 8 is a simplified longitudinal cross sectional view of the catalytic combustor to be used in the fuel cell system shown in FIG. 1 in accordance with a fifth embodiment of the present invention.

FIG. 8 is a side cross sectional view of a fifth embodiment of the catalytic combustor 25. This embodiment is similar to the third embodiment shown in FIG. 3, except that the partitioning pipe 47 is arranged in the center of the housing 27 and the upstream end of the partitioning pipe 47 is closed with an end plate 55 serving to obstruct cathode off gas entity. The end plate 55 in this embodiment is a butterfly valve that selectively opens and closes the upstream end of the partitioning pipe 47. Another difference is that this embodiment includes a temperature sensor 51. Otherwise, this embodiment is the same as the third embodiment shown in FIG. 6.

It is also acceptable for the partitioning pipe 47 to be positioned at the top of the housing 27 as shown in FIG. 6 instead of at the center of the housing 27.

With this embodiment, cathode off gas containing a large amount of condensed moisture does not enter the upper flow passage because the end plate 55 closes the partitioning pipe 47. Consequently, combustion is conducted using the even drier ventilation air introduced from the ventilation air introducing port 53, enabling reliable and effective combustion to be conducted at the additional catalyst 49.

Although in this embodiment the end plate 55 uses a butterfly valve or other device capable of opening and closing the upper flow path 37 it is also acceptable to use a fixed plate instead of a movable plate. However, by using a butterfly valve or other device capable of opening and closing the upper flow path 37, the upstream end of the upper flow path 37 can be opened and closed in accordance with the operating state of the fuel cell 1. More specifically, the flow rate of cathode off gas flowing into the upper flow path 37 can be adjusted according to the combustion state (detected by the temperature sensor 51) of the additional catalyst 49 inside the upper flow path 37 at any given time, and thus, the combustion temperature inside the upper flow path 37 can be controlled.

For example, in order to prevent the fuel concentration of the gas mixture flowing through the upper flow path 37 from becoming too high, the upstream end of the upper flow path 37 can be opened to allow cathode off gas to flow in and lower the fuel concentration.

Sixth Embodiment of the Catalytic Combustor

Figure 9:
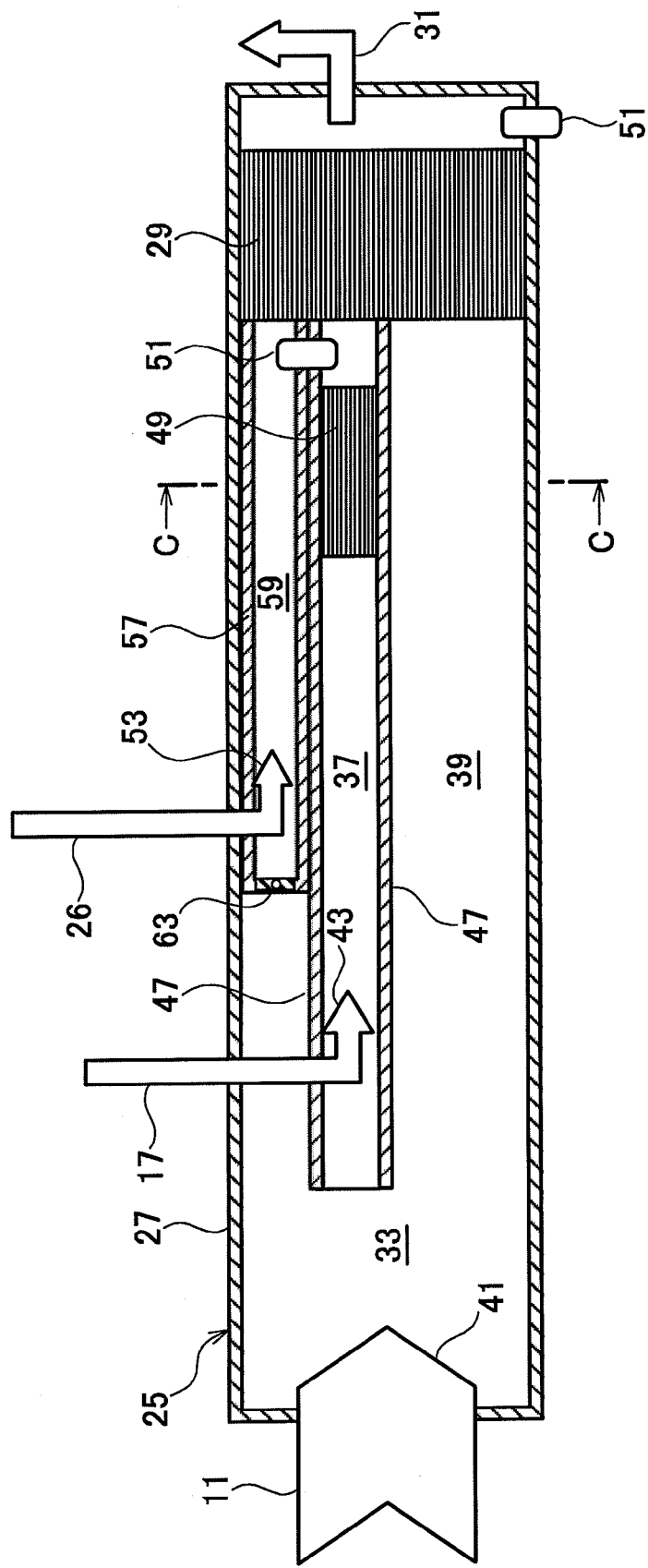
FIG. 9 is a simplified longitudinal cross sectional view of the catalytic combustor to be used in the fuel cell system shown in FIG. 1 in accordance with a sixth embodiment of the present invention.
Figure 10A:
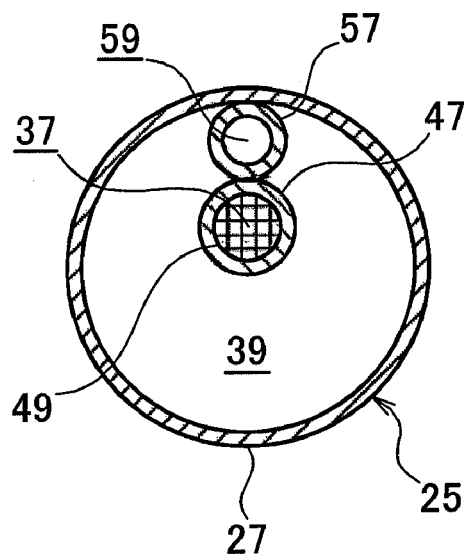
FIG. 10(a) is a simplified transverse cross sectional view of the catalytic combustor illustrated in FIG. 9 taken along section line C-C of FIG. 9 in accordance with the sixth embodiment of the present invention.
Figure 10B:
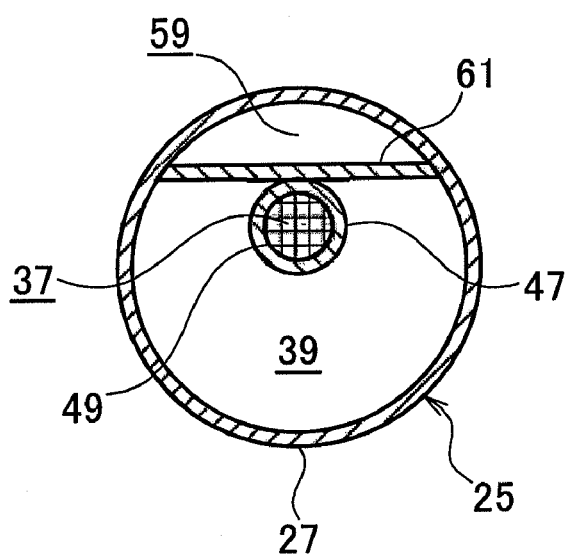
FIG. 10(b) is a simplified transverse cross sectional view, similar to FIG. 10(a), of a catalytic combustor in accordance with a first variation of the sixth embodiment of the present invention.
Figure 11A:
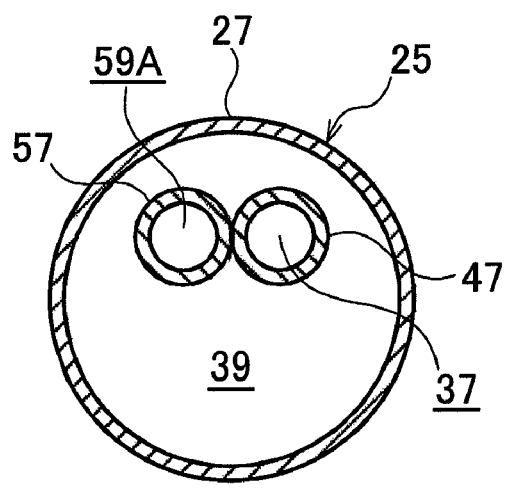
FIGS. 11(a) to 11(d) are simplified transverse cross sectional views illustrating some variations of the catalytic combustor shown in FIG. 10(a)
Figure 11B:
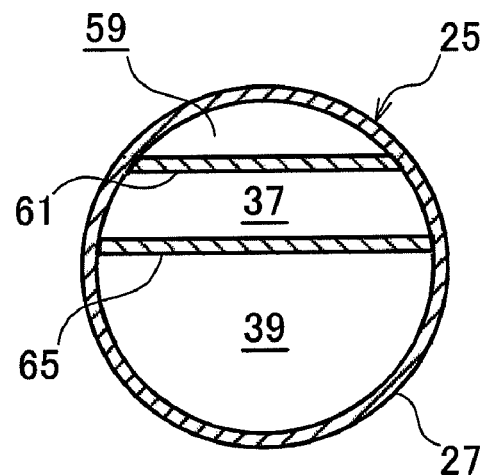
Figure 11C:
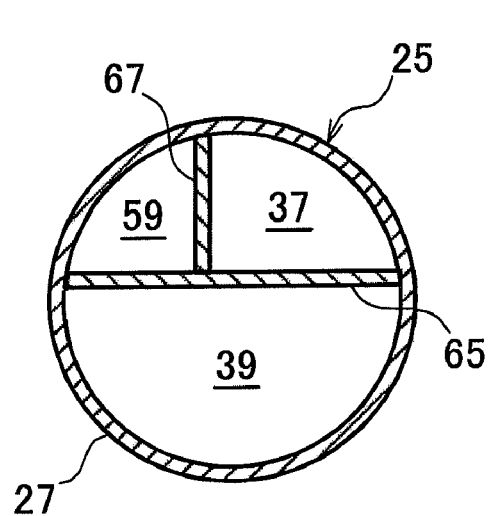
Figure 11D:
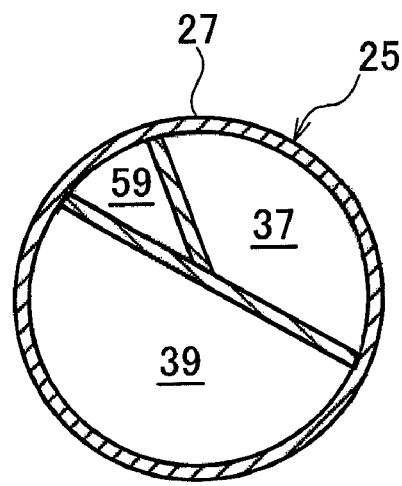

FIG. 9 is a side cross sectional view of a sixth embodiment of the catalytic combustor 25. FIG. 10(*a*) is a cross sectional view taken along section line C-C of FIG. 9. In this embodiment, inside of the housing 27 of the catalytic combustor 25 is divided into three flow paths according to the properties of the gases supplied thereto. More specifically, the upper flow path 37 is formed inside the housing 27 by installing the partitioning pipe 47 substantially the same as the partitioning pipe 47 of the second embodiment shown in FIG. 4, and an uppermost passageway 59 is formed by installing a separate partitioning pipe 57 between the top side of the partitioning pipe 47 and an upper portion of the internal wall of the housing 27.

It is also acceptable to form the uppermost passageway 59 by installing a horizontal partitioning plate 61 above the partitioning pipe 47 as shown in FIG. 10(*b*) instead installing a partitioning pipe 57 as shown in FIG. 10(*a*).

The anode off gas pipe 17 is connected to the upper flow path 37 and the ventilation air discharge pipe 26 is connected to the uppermost flow path 59. An end plate 63 serving as an obstructing entity is arranged so as to close the upstream end of the uppermost flow path 59. Meanwhile, as in the previous embodiments, the cathode off gas pipe 11 is connected to the upstream end of the housing 27. Thus, with this embodiment, a portion of the cathode off gas introduced into the gas flow passage 33 through the cathode off gas pipe 11 enters the upper flow path 37 and the remainder flows into the lower flow path 39.

Similarly to the configuration shown in FIG. 4, the additional catalyst 49 is installed inside the upper flow path 37 at a position near the catalyst 29 and a gas mixing unit (not shown) for mixing the anode off gas and cathode off gas together is installed inside the upper flow path 37 at a position upstream of the additional catalyst 49.

Thus, similarly to the second embodiment shown in FIG. 4, the anode off gas is mixed with comparatively dry cathode off gas in the upper flow path 37 and the resulting gas mixture is combusted with good efficiency by the additional catalyst 49. High-temperature gas resulting from the combustion conducted at the additional catalyst 49 is then supplied to the catalyst 29 downstream. The heat of the high-temperature gas raises the temperature of the catalyst 29 and increases the combustion efficiency of the catalyst 29 as a whole.

Meanwhile, the ventilation air introduced into the uppermost flow path 59 from the ventilation air discharge pipe 26 is also supplied to the catalyst 29. Since the catalyst has been sufficiently warmed so as to have a high degree of catalytic activity, the small amount of hydrogen contained in the ventilation air can also be combusted even if the concentration thereof is extremely low.

In the sixth embodiment shown in FIG. 9, by installing an additional temperature sensor 51 downstream of the catalyst 29, the combustion gas temperature downstream of the catalyst 29 can be detected and the detected temperature can be used to detect combustion abnormalities in the catalyst 29 and to execute various controls.

Additionally, it is also possible to calculate the amount of hydrogen that is passing out of the fuel cell 1 into the ventilation air inside the case 7 by providing a gas flow rate measuring means in the uppermost flow path 59 and basing the calculation on the flow rate of ventilation air detected by the measuring means and the combustion state detected by the temperature sensor 51 arranged downstream of the catalytic converter 29.

Although in this embodiment the end plate 63 uses a butterfly valve or other device capable of opening and closing the uppermost flow path 59 (similarly to the end plate 55 shown in FIG. 8) it is also acceptable to use a fixed plate instead of a movable plate. However, by using such a movable device, the upstream end of the uppermost flow path 59 can be opened and closed in accordance with the operating state of the fuel cell 1. More specifically, the flow rate of cathode off gas flowing into the uppermost flow path 59 can be adjusted according to the combustion state (detected by the temperature sensor 51 arranged downstream of the catalyst 29) of the catalyst 29 located downstream of the uppermost flow path 59 at any given time and, thus, the combustion temperature at the catalyst 29 can be controlled.

FIGS. 11(*a*) to 11(*d*) show some other alternative examples of how to divide the gas flow passage 33 into three flow paths as is done in the sixth embodiment shown in FIG. 9 (i.e., the upper flow path 37, the lower flow path 39, and the uppermost flow path 59).

In the example shown in FIG. 11(*a*), the upper flow path 37 and the flow path 59A corresponding to the uppermost flow path 59 of FIG. 10(*a*) are both formed with the partitioning pipes 47 and 57, which are arranged horizontally and adjacent to each other. The example shown in FIG. 11(*b*) is similar to the example shown in FIG. 10(*b*), except that the partitioning pipe 47 forming the upper flow path 37 is replaced with a horizontal partitioning plate 65. The example shown in FIG. 11(*c*) is similar to the example shown in FIG. 11(*b*), except that the horizontal partitioning plate 61 has been replaced with a vertical partitioning plate 67 arranged perpendicularly to the partitioning plate 65. The example shown in FIG. 11(*d*) is similar to the example shown in FIG. 11(*c*), except that both of the partitioning plates 65 and 67 are arranged to be slanted in a manner that is appropriate in view of the design considerations.

With each of the examples shown in FIGS. 11(*a*), 11(*c*), and 11(*d*), the upper flow path 37 can be positioned inside the housing 27 so as to be offset toward the front of the vehicle similarly to the example shown in FIG. 5(*b*). Positioning the upper flow path 37 in this manner prevents cathode off gas containing large amounts of moisture from flowing into the upper flow path 37 and enables the combustion characteristics of the catalytic combustor 25 to be improved in situations where the fuel cell system is installed in a vehicle.

Seventh Embodiment of the Catalytic Combustor

Figure 12:
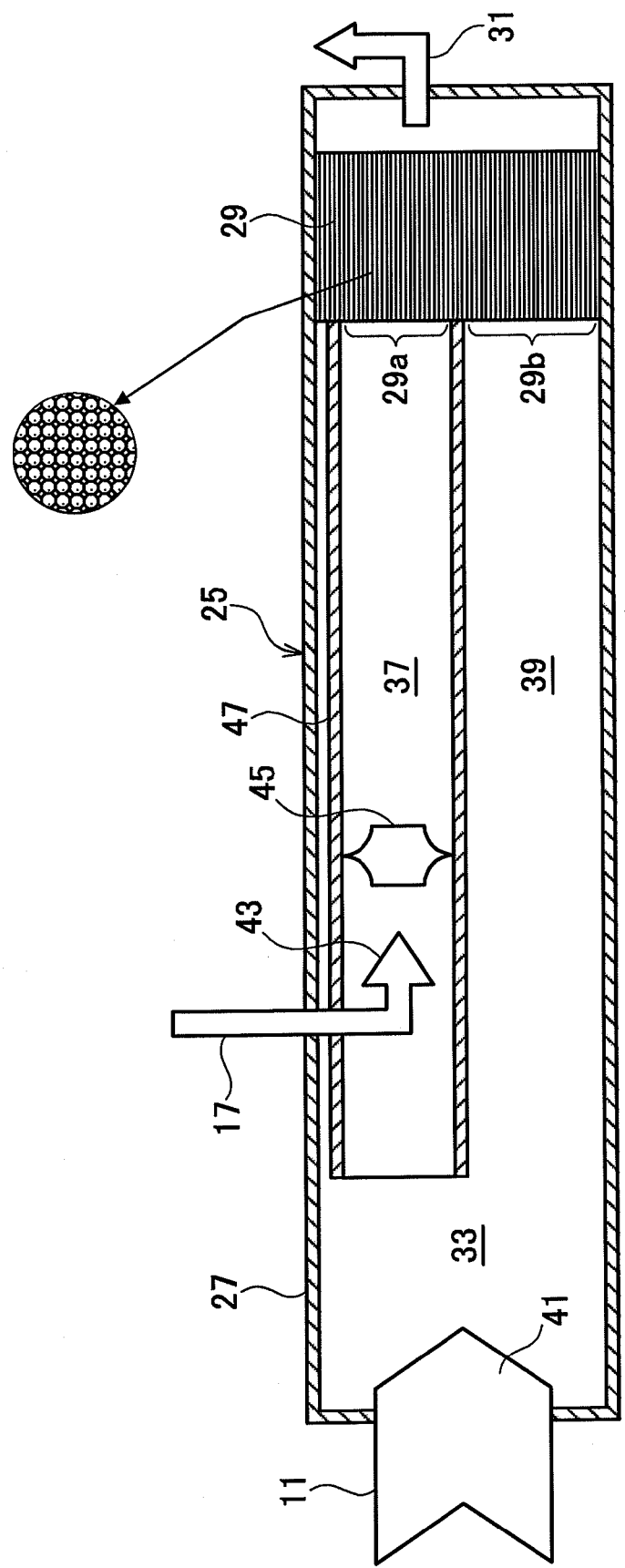
FIG. 12 is a simplified longitudinal cross sectional view of the catalytic combustor to be used in the fuel cell system shown in FIG. 1 in accordance with a seventh embodiment of the present invention.

Referring now to FIG. 12, this embodiment is basically the same as any of the embodiments shown in FIGS. 4 to 11, except that the additional catalyst 49 is not provided and the catalyst 29 is configured with two catalyst sections having different set of specifications. In each of the embodiments shown in FIGS. 4 to 11, the catalyst 29 that is arranged in the downstream end of the inside of the housing 27 and the additional catalyst 49 that is arranged in the upper flow path 37 can have the same specifications (characteristics) or different set of specifications A and B, respectively, as explained below.

In this embodiment of FIG. 12, the catalyst 29 includes a vertically upper portion 29a and a vertically lower portion 29b. The vertically upper portion 29a has a different set of specifications from the vertically lower portion 29b. In particular, the vertically upper portion 29a of the catalyst 29 is configured and arranged to correspond to the upper flow path 37 with the vertically upper portion 29a having the specifications A, while the vertically lower portion 29b is configured and arranged to correspond to the lower flow path 39 with the vertically lower portion 29b having the specifications B since large amounts of moisture flows through the lower flow path 39. This approach is particularly useful with respect to a catalytic combustor that does not have a catalyst provided in the upper flow path 37.

Each of the working examples described below is explained in the context of either a catalytic combustor having the additional catalyst 49 in the upper flow path 37 or a catalytic combustor without the additional catalyst 49 in the upper flow path 37. The seventh embodiment can be applied in either configuration of catalytic combustor.

Additionally, as described previously, the catalysts 29 and 49 comprised of platinum or another precious metal carried on a catalyst carrier that has a honeycomb structure and is made of ceramic or metal as seen in the inset of FIG. 12. The catalyst carrier A wash coat made of a ceramic material and having the platinum or other precious metal dispersed therein is applied to the catalyst carrier such that the precious metal is carried on the catalyst.

Working Example 1

In this working example, the volumetric density of the precious metal in the catalyst made to the specifications A is 1.0 g/L (i.e., 1.0 g of precious metal is carried per 1 L of catalyst volume) and the volumetric density of the precious metal in the catalyst made to the specifications B is 1.5 g/L (i.e., 1.5 g of precious metal is carried per 1 L of catalyst volume).

Thus, in this embodiment, the volumetric density of the precious metal in the catalyst 49 arranged corresponding to the upper flow path 37 positioned in a vertically upper position (and/or in the vertically upper portion 29a of the catalyst 29 arranged downstream) is lower than the volumetric density of the precious metal in the catalyst 29 (or the vertically lower portion 29b of the catalyst 29) arranged corresponding to the lower flow path 39 positioned in a vertically lower position.

Since the combustion performance of a combustion catalyst improves when the amount of precious metal is increased, the combustion characteristics of a catalyst provided in a flow passage that carries a large amount of anode gas or other gas targeted for combustion is improved by increasing the amount of precious metal. However, the cost increases when the amount of precious metal used increases.

Therefore, in this embodiment, the specifications (characteristics) of the catalyst are varied in accordance with the effects of moisture that flows into the catalyst. If the amount of moisture flowing in is small, the ignitability at the initial stage of combustion or at the start of combustion can be sufficiently increased and stable combustion can be accomplished after ignition even if a smaller density of precious metal is used.

Therefore, in this embodiment, the cost is held down while also ensuring good combustion characteristics by making the amount of the precious metal in the catalyst 49 arranged in the upper flow path 37 into which anode off gas is supplied and the amount of moisture is comparatively small (and/or the amount of precious metal in the vertically upper portion 29a of the catalyst 29 arranged downstream) smaller than the amount of precious metal in the catalyst 29 (or the vertically lower portion 29b of the catalyst 29) arranged downstream of the lower flow path 39 into which a large amount of moisture flows.

Thus, by using a different density of precious metal in the catalyst corresponding to the flow path 37 than in the catalyst corresponding to the flow path 39, the combustion characteristics can be improved at a lower cost than in a case where catalysts having the same specifications (characteristics) are used in both locations.

Working Example 2

In this working example, the volumetric density of the wash coat of the catalyst made to the specifications A is 20.0 g/L (i.e., 20.0 g of wash coat is carried per 1 L of catalyst volume) and the volumetric density of the wash coat of the catalyst made to the specifications B is 10.0 g/L (i.e., 10.0 g of wash coat is carried per 1 L of catalyst volume).

Thus, in this embodiment, the volumetric density of the wash coat of the catalyst 49 arranged corresponding to the upper flow path 37 positioned in a vertically upper position (and/or the volumetric density of the wash coat of the vertically upper portion 29a of the catalyst 29 arranged downstream) is higher than the volumetric density of the wash coat of the catalyst 29 (or the vertically lower portion 29b of the catalyst 29) arranged corresponding to the lower flow path 39 positioned in a vertically lower position.

When the main component of the wash coat carried on the catalyst is a ceramic material, moisture tends to adhere to the wash coat. Consequently, the combustion performance declines when a large amount of moisture is supplied to the catalyst. The amount of wash coat also affects the durability of the catalyst.

Consequently, the amount of wash coat needs to be balanced such that it is large enough to ensure sufficient durability and small enough to obtain sufficient combustion performance. Thus, sufficient durability can be ensured by increasing the amount of wash coat on the catalyst 49 arranged in the upper flow path 37, into which anode off gas is supplied and the amount of moisture supplied is normally small (and/or the amount of wash coat on the vertically upper portion 29a of the catalyst 29 arranged downstream).

Since the decline in combustion performance due to adsorption of moisture is small at the catalyst 49 in the upper flow path 37, the sufficient ignitability can be secured at the initial stage of combustion or at the start of combustion and stable combustion can be accomplished after ignition.

Conversely, since the fuel concentration of the gas flowing into the catalyst of the vertically lower portion 29b arranged downstream of the lower flow path 39 is low and the moisture content is high, it is necessary to give priority to moisture resistance (combustion performance when large amounts of moisture are supplied) over durability. Therefore, the amount of wash coat on the catalyst of the vertically lower portion 29*b* is reduced so that the combustion performance can be prevented from declining due to the adsorption of moisture onto the wash coat.

Thus, by using a different density of wash coat on the catalyst corresponding to the flow path 37 than on the catalyst corresponding to the flow path 39, both durability and moisture resistance (combustion performance when large amounts of moisture are supplied) can be secured simultaneously to a greater degree than in a case where catalysts having the same specifications (characteristics) are used in both locations.

Working Example 3

In this working example, the ratio of the mass of the precious metal to the mass of the wash coat in the catalyst made to the specifications A is 0.05 (i.e., 1.0 g of precious metal is carried per 20 g of wash coat) and the ratio of the mass of the precious metal to the mass of the wash coat in the catalyst made to the specifications B is 0.15 (i.e., 1.5 g of precious metal is carried per 10.0 g of wash coat).

Thus, in this embodiment, the ratio of the volumetric density of the precious metal to the volumetric density of the wash coat in the catalyst 49 arranged corresponding to the upper flow path 37 positioned in a vertically upper position (and/or the ratio of the volumetric density of the precious metal to the volumetric density of the wash coat in the vertically upper portion 29*a* of the catalyst 29 arranged downstream) is lower than the ratio of the volumetric density of the precious metal to the volumetric density of the wash coat in the catalyst 29 (or the vertically lower portion 29*b* of the catalyst 29) arranged corresponding to the lower flow path 39 positioned in a vertically lower position.

With this working example, a high-performance catalytic combustor can be obtained which provides the effects of both Working Example 1 and Working Example 2.

Working Example 4

In this working example, the cell density of the catalyst carrier of the catalyst made to the specifications A is 600 cpsi (600 cells per 1 square inch) and the cell density of the catalyst carrier of the catalyst made to the specifications B is 200 cpsi (200 cells per 1 square inch).

Thus, in this embodiment, the cell density of the catalyst carrier of the catalyst 49 arranged corresponding to the upper flow path 37 positioned in a vertically upper position (and/or the cell density of the catalyst carrier of the vertically upper portion 29*a* of the catalyst 29 arranged downstream) is higher than the cell density of the catalyst carrier of the catalyst 29 (or the vertically lower portion 29*b* of the catalyst 29) arranged corresponding to the lower flow path 39 positioned in a vertically lower position.

While the combustion performance of a catalyst is proportional to the cell density, the pressure loss due to resistance to air flow through the catalyst is inversely proportional to the cell density. If the cell density is high, then when large amounts of moisture are supplied to the catalyst, the flow passages inside the catalyst can become blocked with water and the combustion performance of the catalyst might decline.

Thus, sufficient combustion performance can be obtained by increasing the cell density of the catalyst 49 arranged in the upper flow path 37, into which anode off gas containing little moisture and a high concentration of fuel is supplied (and/or the cell density of the vertically upper portion 29*a* of the catalyst 29 arranged downstream).

Additionally, although there is the possibility that the pressure loss will increase due to the higher cell density, the possibility of clogging and other problems occurring due to water is low because the amount of moisture flowing into the upper flow path 37 is small. Meanwhile, even though the amount of moisture flowing into the lower flow path 39 is large, clogging of the flow path and other problems can be prevented from occurring in the vertically lower portion 29*b* of the catalyst 29 located downstream of the lower flow path 39 because the cell density of the vertically lower portion 29*b* of the catalyst 29 has been reduced.

Working Example 5

In this embodiment, the surface area to volume ratio of the catalyst (including the wash coat and precious metal) made to the specifications A is 600 m2/L (i.e., 600 square meter of surface area per 1 L catalyst volume) and the surface area to volume ratio of the catalyst (including the wash coat and precious metal) made to the specifications B is 350 m2/L.

Also, since, for example, 99% or higher of the surface area of the catalyst is occupied by the wash coat liquid as opposed to the precious metal, the aforementioned surface area to volume ratio of the catalyst can be assumed to be the ratio of the wash coat surface area to the catalyst volume.

Thus, in this embodiment, the ratio of the wash coat surface area to the catalyst volume of the catalyst 49 arranged corresponding to the upper flow path 37 positioned in a vertically upper position (and/or ratio of the wash coat surface area to the catalyst volume of the vertically upper portion 29*a* of the catalyst 29 arranged downstream) is higher than the ratio of the wash coat surface area to the catalyst volume of the catalyst 29 (or the vertically lower portion 29*b* of the catalyst 29) arranged corresponding to the lower flow path 39 positioned in a vertically lower position.

While the combustion performance of the catalyst is proportional to the surface area of the wash coat (surface area of the catalyst including the wash coat and the precious metal), the tendency to adsorb moisture to the wash coat also increases proportionally to the surface area of the wash coat (surface area of the catalyst including the wash coat and the precious metal). Thus, there is the possibility that excessive adsorption of moisture will cause the combustion performance to decline. Therefore, the combustion performance can be improved by increasing the ratio of the wash coat surface area (catalyst surface area including the wash coat and the precious metal) to the catalyst volume of the catalyst 49 arranged in the upper flow path 37, into which anode off gas containing little moisture is supplied (and/or the ratio of the wash coat surface area to the catalyst volume of the vertically upper portion 29*a* of the catalyst 29 arranged downstream).

Meanwhile, even though the amount of moisture flowing into the lower flow path 39 is large, excessive adherence of moisture and declined combustion performance can be prevented from occurring at the vertically lower portion 29*b* of the catalyst 29 located downstream of the lower flow path 39 because the ratio of the wash coat surface area (catalyst surface area including the wash coat and the precious metal) to the catalyst volume of the vertically lower portion 29*b* of the catalyst 29 has been reduced.

Other Working Examples

Different effects can be obtained by combining the constituent features of the Working Examples 1 to 4 in appropriate ways.

For example, the catalyst made to the specifications A can be configured such that the volumetric density of the precious metal is 5 g/L, the ratio of the precious metal to the wash coat is 0.02, and the ratio of the wash coat surface area to the catalyst volume is 500 m2/L and the catalyst made to the specifications B can be configured such that the volumetric density of the precious metal is 9 g/L, the ratio of the precious metal to the wash coat is 0.09, and the ratio of the wash coat surface area to the catalyst volume is 350 m2/L.

The vertically upper portion 29a of the catalyst 29 having the specifications A is arranged in the downstream portion of the upper flow path 37 because sufficient combustion performance can be obtained with a smaller amount of precious metal if the amount of moisture is small. Meanwhile, the vertically lower portion 29b of the catalyst 29 is provide downstream of the lower flow path 39 because it can provide a sufficient level of performance even when a large amount of moisture is supplied.

Thus, since this working example allows the specifications of the catalysts to be adjusted appropriately and finely, the combustion performance of the catalytic combustor as a whole can be greatly improved over the combustion performance of a catalytic combustor in which catalysts having the same specifications are provided downstream of both flow paths 37 and 39.

The invention is not limited by the numeric values and ratios used in the preceding embodiments. These values and ratios can be changed as appropriate.

The working examples can also be applied to a catalytic combustor that, like the catalytic combustor depicted in FIG. 2, does not have a specific catalyst to which anode off gas is directed because anode off gas is lighter than the cathode off gas and will therefore tend to flow into the upper flow passage(s). However, the effect of improving the combustion performance is greater when the working examples are applied to a catalytic combustor that, like the catalytic combustor depicted in FIG. 4, does have a specific catalyst to which anode off gas is directed.

Table 1 shows the magnitude relationships of the following characteristic quantities associated with catalysts made to the specifications A and the specifications B, respectively: the volumetric density of the precious metal, the volumetric density of the wash coat, the ratio of the volumetric density of the precious metal to the volumetric density of the wash coat, the cell density, and the ratio of the wash coat surface area to the catalyst volume.

TABLE 1

| | Catalyst Specification | | |
|---|---|---|---|
| | Specification A | | Specification B |
| Volumetric density of the precious metal | $\alpha$ g/L | < | $\beta$ g/L |
| Volumetric density of the wash coat | $\alpha$ g/L | > | $\beta$ g/L |
| Ratio of the volumetric density of the precious metal to the volumetric density of the wash coat | $\alpha$ | < | $\beta$ |
| Cell density | $\alpha$ cpsi | > | $\beta$ cpsi |
| Ratio of the wash coat surface area to the catalyst volume | $\alpha$ m²/L | > | $\beta$ m²/L |

As shown in Table 1, the volumetric density of the precious metal and the ratio of the volumetric density of the precious metal to the volumetric density of the wash coat are larger for the catalyst made to the specifications B than for the catalyst made to the specifications A. Meanwhile, the volumetric density of the wash coat, the cell density, and the ratio of the wash coat surface area to the catalyst volume are larger for the catalyst made to the specifications A than for the catalyst made to the specifications B.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A catalytic combustor comprising:
    a housing including an anode off gas inlet for receiving anode off gas discharged from an anode of a fuel cell, a cathode off gas inlet for receiving cathode off gas discharged from a cathode of the fuel cell, a ventilation air inlet receiving ventilation air from a space inside a case accommodating the fuel cell, the space formed between the case and the fuel cell, and an exhaust gas outlet for discharging combusted gas, the cathode off gas inlet being coupled to an upstream end face of the housing and the anode off gas inlet being coupled to a side face of the housing at a position downstream relative to the cathode off gas inlet; and a catalyst disposed inside the housing between the anode off gas and cathode off gas inlets and the exhaust gas outlet, the housing being configured to form a horizontally arranged gas flow passage that receives the anode off gas and cathode off gas flow in an upstream portion that directs the anode off gas and cathode off gas to the catalyst, the upstream portion including a divided section that is located directly upstream of the catalyst and divided into at least two vertically arranged flow paths.

2. The catalytic combustor as recited in claim 1, further comprising a temperature detecting device is provided in at least one of the flow paths.

3. The catalytic combustor as recited in claim 1, wherein the anode off gas inlet is configured and arranged to supply the anode off gas to a vertically upper position of the divided section of the gas flow passage.

4. The catalytic combustor as recited in claim 1, wherein the ventilation air inlet is arranged to supply the ventilation air to a vertically upper position of the divided section of the gas flow passage.

5. The catalytic combustor as recited in claim 4, wherein a vertically upper one of the flow paths has an upstream end that is closed.

6. The catalytic combustor as recited in claim 1, wherein an additional catalyst separate from the catalyst is provided in a flow passage located in a vertically upper position of the divided section of the gas flow passage.

7. The catalytic combustor as recited in claim 1, wherein the housing enclosing the catalyst is configured and arranged to be installed in a vehicle containing the fuel cell such that a longitudinal axis of the gas flow passage extends in a direction that intersects with a forward movement direction of the vehicle, and a vertically upper one of the flow paths is arranged generally toward a front end of the vehicle inside the housing.

8. The catalytic combustor as recited in claim 1, wherein the gas flow passage provided inside the housing is divided into three of the flow paths that are arranged in accordance with properties of gases to be supplied thereto.

9. The catalytic combustor as recited in claim 8, further comprising an additional catalyst separate from the catalyst is provided in at least one of the three flow paths.

10. The catalytic combustor as recited in claim 8, wherein the anode off gas inlet is configured and arranged to supply the anode off gas to a vertically upper one of the three flow paths, and the ventilation air discharged from the inside of the case of the fuel cell is supplied to another vertically upper one of the three flow paths.

11. The catalytic combustor as recited in claim 10, wherein the vertically upper one of the flow paths is configured and arranged to receives the ventilation air has an upstream end which is closed.

12. The catalytic combustor as recited in claim 5, wherein the vertically upper one of the flow paths has an obstructing entity that is configured and arranged to selectively close and open the upstream end of the vertically upper one of the flow paths.

13. The catalytic combustor as recited in claim 1, wherein the catalyst comprises a catalyst carrier having a plurality of cells, a wash coat disposed on the catalyst carrier and a precious metal dispersed in the catalyst carrier; and the precious metal in the catalyst has a vertically lower portion with a first volumetric density and a vertically upper portion with a second volumetric density that is lower than the first volumetric density of the vertically lower portion.

14. The catalytic combustor as recited in claim 1, wherein the catalyst comprises a catalyst carrier having a plurality of cells, a wash coat disposed on the catalyst carrier and a precious metal dispersed in the catalyst carrier; and the wash coat on the catalyst carrier has a vertically lower section with a first volumetric density and a vertically upper section with a second volumetric density that is higher than the first volumetric density of the vertically lower section.

15. The catalytic combustor as recited in claim 1, wherein the catalyst comprises a catalyst carrier having a plurality of cells, a wash coat disposed on the catalyst carrier and a precious metal dispersed in the catalyst carrier;

the precious metal in the catalyst has a vertically lower portion with a first volumetric density and a vertically upper portion with a second volumetric density;

the wash coat on the catalyst carrier has a vertically lower section with a first volumetric density and a vertically upper section with a second volumetric density that is higher than the first volumetric density of the vertically lower section; and a ratio of the first volumetric density of the wash coat with respect to the first volumetric density of the precious metal is lower than a ratio of the second volumetric density of the wash coat with respect to the second volumetric density of the precious metal.

16. The catalytic combustor as recited in claim 1, wherein the catalyst comprises a catalyst carrier having a plurality of cells, a wash coat disposed on the catalyst carrier and a precious metal dispersed in the catalyst carrier; and the catalyst carrier has a vertically lower section with a first cell density and a vertically upper section with a second cell density that is higher than the first cell density of the vertically lower section.

17. The catalytic combustor as recited in claim 1, wherein the catalyst comprises a catalyst carrier having a plurality of cells, a wash coat disposed on the catalyst carrier and a precious metal dispersed in the catalyst carrier; and the ratio of the surface area of the wash coat to the volume of the catalyst the wash coat on the catalyst carrier has a vertically lower section with a first surface area ratio to a volume of the precious metal and a vertically upper section with a second surface area ratio to a volume of the precious metal that is higher than the first surface area ratio of the vertically lower section.

* * * * *